July 28, 1925.  1,548,002

A. E. HELMRICH

RECTIFIER FOR CAMERAS

Filed April 12, 1922

Arthur E. Helmrich, INVENTOR

BY Victor J. Evans ATTORNEY

WITNESS: Fred W. Ely

Patented July 28, 1925.

1,548,002

UNITED STATES PATENT OFFICE.

ARTHUR EDWARD HELMRICH, OF NEW YORK, N. Y., ASSIGNOR OF ONE-FIFTH TO BRYAN LYCAN, OF NEW YORK, N. Y.

RECTIFIER FOR CAMERAS.

Application filed April 12, 1922. Serial No. 551,804.

*To all whom it may concern:*

Be it known that I, ARTHUR E. HELMRICH, a citizen of the United States, residing at New York, in the county of New York and State of New York, have invented new and useful Improvements in Rectifiers for Cameras, of which the following is a specification.

This invention relates to rectifiers for cameras.

Some of the objects of the present invention are: to provide means in a camera so that the sensitized substance, plate or film will be always exactly in the focus irrespective of the relative angular disposition of the object-glass; to provide means for a motion picture camera for maintaining the film portion upon which the image or images of an object or objects respectively are focused in the registration thereof in a vertical plane irrespective of the position to which the case embodying said means and an object-glass is moved; to eliminate "tilting appearances" in positives while obtaining "close-ups" in elevated positions without elevating the camera. With these and other objects in view the invention resides in its application to different types of cameras, the particular provision and operation of parts hereinafter fully described and illustrated in the accompanying drawing, in which:

Figure 1:
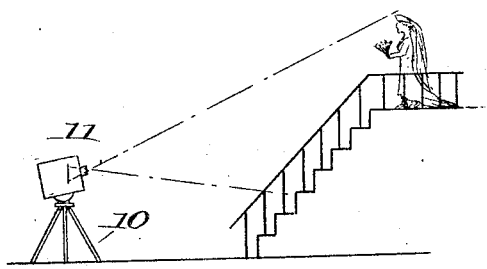
Figure 1 is a view illustrating the use of the present invention.
Figure 2:
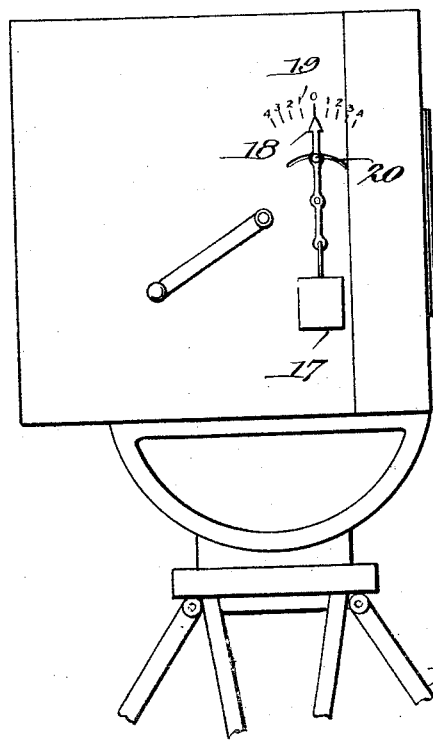
Figure 2 is a side elevation of a motion picture camera embodying the present invention and showing the weighted means connected to the film guide.
Figure 3:
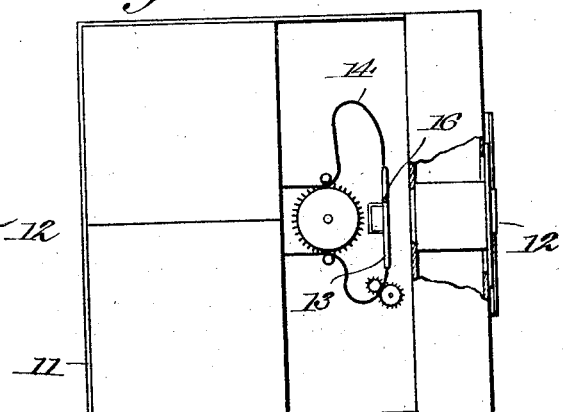
Figure 3 is a sectional elevation illustrating the film guide and the object-glass of the camera shown in Figure 2.
Figures 4, 5:
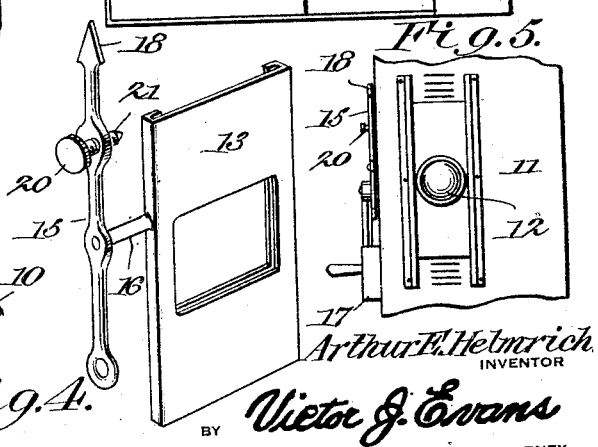
Figure 4 is a detached perspective view of the film guide and the indicating and weight supporting arm or member connected thereto.
Figure 5 is a detail front view of the adjustable object-glass.

From experience it has been found that in order to obviate "tilting appearances" in positives while obtaining "close-ups", the photographer with the present day cameras is compelled to elevate the camera which is a great source of trouble, delay and inconvenience. In order to overcome the mentioned disadvantages, within the present invention, the sensitized substance, plate or film is always maintained in a vertical plane with respect to the ground while the object-glass is moved vertically to the desired angle; the sensitized substance, plate or film being kept in the focus in its vertical position, thus eliminating the "tilting appearance" of the object or objects being photographed. Were the film or plate and the object-glass in parallel relation, tilted to get the desired "close-up", the object or objects as registered on the positive would appear to be inclined backwardly, or to have a "tilting appearance".

In Figures 1 to 5 inclusive the invention is shown as applied to a motion picture camera. The camera essentially includes a tripod 10; a case 11 mounted upon the tripod 10 so as to be rotatable thereon, and tiltable; an object-glass having a lens 12; and film feeding mechanism including a film channel or guide 13. The lens 12 is adjustable relatively to the case 11 and therefore it is relatively adjustble to the portion of the film 14 adjacent thereto.

In order that the film portion 14 may at all times be disposed vertically to a true horizontal plane, the guide 13 is mounted for oscillatory movement, and the said guide has connected thereto a member 15 by virtue of a pintle 16. The member 15, at the lower end thereof, has removably connected thereto a weight 17. The upper end of the member 15 is pointed as at 18, and the pointed end, coacts with a scale 19 on the adjacent side wall of the case 11. It will now be manifest that when the case 11 is tilted on its mounting, the weight 17 under the action of gravity will maintain the guide 13 in a true vertical plane, and as a consequence the film portion 14 will likewise be maintained in a true vertical plane. The lens 12 however will be disposed at an angle with respect to the film portion 14, and that relation of the lens 12 with respect to the film portion 14 it will be indicated by the coaction of the pointed end 18 and the scale 19, as will be understood. The film portion 14 of course is kept in the focus. The camera is now ready for the photographing operation. Figure 1, in a conventional manner, illustrates how an object on a stair landing may be photographed. If the film portion 14 were allowed to be moved out of the true vertical plane, the image produced on the film when reproduced would appear to be leaning backward from the eye. With the arrangement shown it is possible to follow the ascending or descending object without elevating or lowering the camera in its entirety, as the case may be.

In order to maintain the desired focus, the member 15 is provided with a screw threaded hole which receives a set screw 20. The end 21 of the screw 20 is screwed home against a plate attached to the side wall of the case 11.

What is claimed is:

1. The combination with a pivotally supported camera, and including an object glass, of a pivotally mounted film holder mounted in the camera and movable in the same plane as the pivotally mounted camera, a graduated scale on one side of the camera and a normally vertically disposed indicator fixed to the film holder and movable over the scale.

2. The combination with a strip film camera, of a pivoted film guide arranged therein and having an exposure opening, an indicating element extending longitudinally of the film guide, a weight depending from the indicating element and normally retaining the same together with the film guide in a vertical position regardless of the angle at which the camera is supported, and an element carried by the indicating element for retaining the guide and indicating element in adjusted position.

In testimony whereof I hereby affix my signature.

ARTHUR EDWARD HELMRICH.